No. 828,154. PATENTED AUG. 7, 1906.
J. H. VENNERS.
WATER PRESSURE INJECTOR.
APPLICATION FILED MAY 17, 1905.
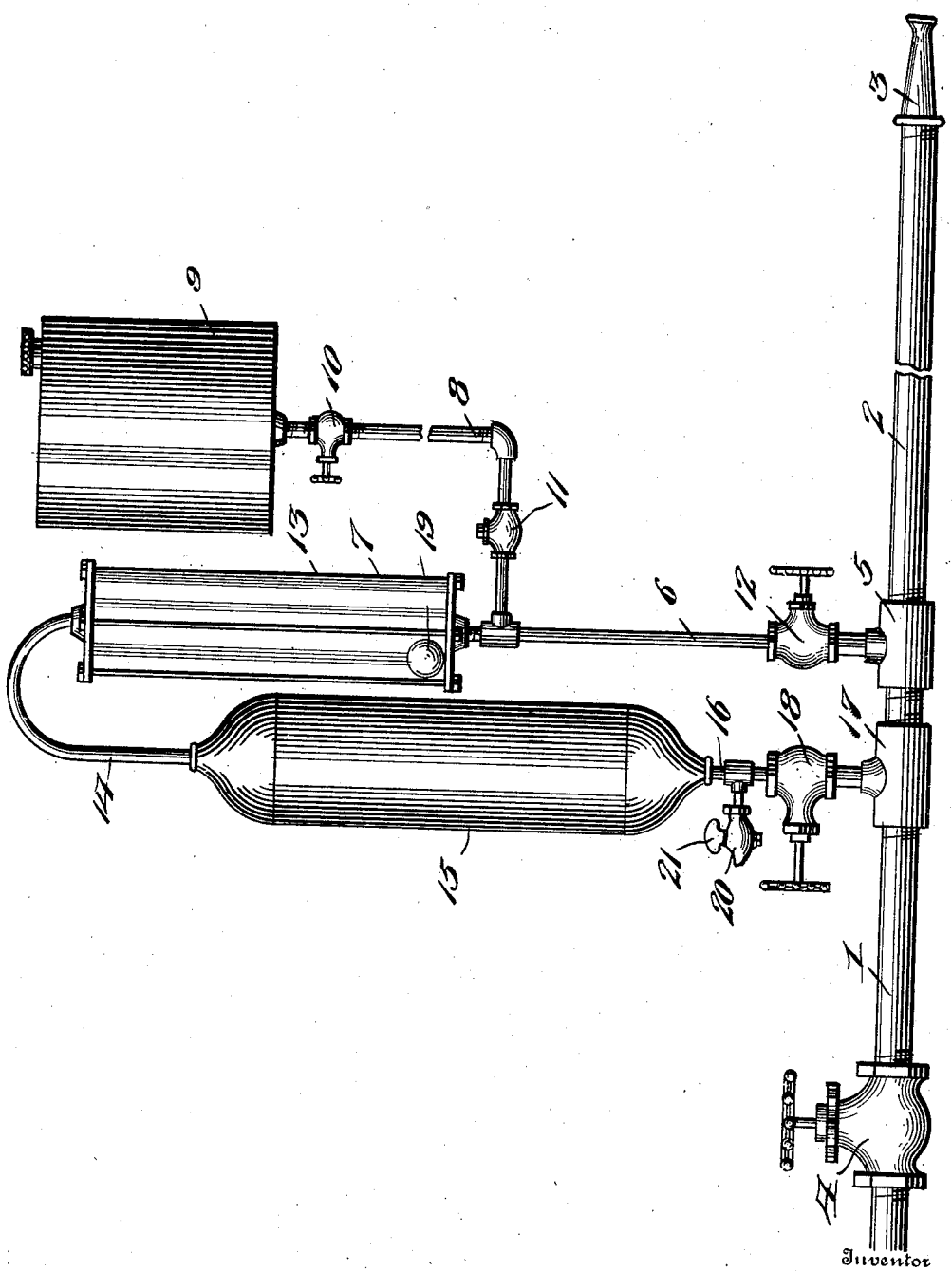
Witnesses
Frank B. Hoffman.
F. S. Elmore
Inventor
James H. Venners
By Victor J. Evans
Attorney

UNITED STATES PATENT OFFICE.

JAMES HENRY VENNERS, OF BROOKLYN, NEW YORK.

WATER-PRESSURE INJECTOR.

No. 828,154.

Specification of Letters Patent.

Patented Aug. 7, 1906.

Application filed May 17, 1905. Serial No. 260,844.

*To all whom it may concern:*

Be it known that I, JAMES HENRY VENNERS, a citizen of the United States of America, residing at Brooklyn, in the county of Kings and State of New York, have invented new and useful Improvements in Water-Pressure Injectors, of which the following is a specification.

This invention relates to water-pressure injectors of the type disclosed in Letters Patent No. 761,021, granted to me May 24, 1904, and has for its objects to produce a comparatively simple inexpensive device of this character in which the chemical will be discharged from its receptacle under the influence of compressed air, one wherein the air will be compressed by water taken from the main to which the device is connected, and one wherein the air will form a cushion between and serve to prevent the water coming into contact with the chemical until the latter is discharged into the main.

With these and other objects in view the invention comprises the novel features of construction and combination of parts more fully hereinafter described.

In the accompanying drawing the figure is a side elevation of an apparatus embodying the invention.

Referring to the drawing, 1 designates a water-main through which water passes under pressure to a flexible pipe or hose 2, provided with an injector-nozzle 3, there being provided in the pipe 1 at a point suitably remote from the hose a controlling-valve 4. The hose 2 is connected with the main 1 by a coupling member or key 5, to which is connected a chemical-feed pipe or duct 6, leading from the lower end of a vessel or receptacle 7 and having a branch portion or section 8 communicating with a tank or reservoir 9 to carry the supply of chemicals, there being provided in the branch duct 8 a cut-off valve 10 and a back-pressure check-valve 11, while the main duct 6 has adjacent its point of connection with the coupling member 5 a cut-off valve 12.

The vessel or receptacle 7, which is preferably composed of glass and housed in a protecting-frame 13, is connected at its upper end, by means of a pipe or duct 14, with the upper end of a compressed-air tank or cylinder 15, in turn connected at its lower end, by means of a pipe 16 and coupling member or T 17, with the water-main 1, there being arranged in the pipe 16 a cut-off valve 18 and within the vessel 7 a ball or float check-valve 19. Connected with and opening from the pipe 16 to the external atmosphere is an air-cock 20, having a suitable valve 21.

In practice, supposing the reservoir 9 to contain a suitable supply of chemical and the cut-off valves 4, 12, and 18 to be closed, the valve 21 is opened to permit the tank 15 to fill with air through the air-cock 20 and the valve 10 is opened to permit the vessel 7 to fill with chemical, it being understood that as the chemical rises in the vessel the float-valve will be carried upward to close the pipe 14, leading from the upper end of said vessel, when the latter is properly filled. After the vessel and tank are filled with chemical and air, respectively, the valves 10 and 21 are closed and the valves 4 and 18 opened, thereby allowing water under pressure from the main 1 to pass through pipe 16 into the tank 15 and to compress the air in the latter, the valve 18 being closed after a suitable air-pressure has been obtained. The valve 12 is next opened sufficiently to permit the desired amount of chemical to flow from vessel 7 into and commingle with the water flowing from the main 1 through the hose 2 to nozzle 3, it being apparent that owing to the pressure in the tank 15 being maintained by water taken from the main duct 1 and acting upon the chemical-supply through the medium of the air in tank 15 the pressure between the chemical fed from pipe 6 and that of the water in the main 1 will be equalized to insure a proper mixing or commingling of the water and chemical, while back pressure of the chemical to tank 9 is obviated by the check-valve 11.

It is apparent from the foregoing that I produce a simple device admirably adapted for the attainment of the ends in view and one wherein the air contained in tank 15 will form a column disposed between and serving to separate the water entering said tank from the chemical forced under pressure from vessel 7, thereby obviating liability of the water mixing with the chemical except upon discharge of the latter from pipe 6 into the main 1. In attaining these ends it is to be understood that minor changes in the details herein set forth may be resorted to without departing from the spirit of the invention.

Having thus described my invention, what I claim is—

1. In a device of the class described, a water-main, an air-tank having communication with the water-main, a receptacle having communication with the air-tank and water-main, and a reservoir having communication with the receptacle at a point between the receptacle and the water-main.

2. In a device of the class described, a water-main, an air-tank having communication with the water-main, a receptacle having communication with the air-tank and water-main, a valve positioned within the receptacle, a reservoir having communication with the receptacle at a point between the receptacle and the water-main, and a check-valve interposed between the receptacle and reservoir.

3. In a device of the class described, a water-main, an air-tank having communication with the water-main, a receptacle having communication with the water-main and air-tank, a reservoir having communication with the receptacle at a point between the receptacle and the water-main, and a check-valve interposed between the reservoir and receptacle.

In testimony whereof I affix my signature in presence of two witnesses.

JAMES HENRY VENNERS.

Witnesses:
THOMAS R. VENNERS.
CHAS. FRIEDENBERG.